United States Patent
Goto et al.

(10) Patent No.: US 8,520,216 B2
(45) Date of Patent: Aug. 27, 2013

(54) SHAPE MEASURING APPARATUS

(75) Inventors: Tomonori Goto, Sapporo (JP); Jyota Miyakura, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 259 days.

(21) Appl. No.: 13/192,595

(22) Filed: Jul. 28, 2011

(65) Prior Publication Data
US 2012/0033229 A1 Feb. 9, 2012

(30) Foreign Application Priority Data
Aug. 6, 2010 (JP) ................................. 2010-177671

(51) Int. Cl.
*G01B 11/02* (2006.01)

(52) U.S. Cl.
USPC .......................................................... 356/511

(58) Field of Classification Search
USPC .................................. 356/489, 495, 497, 511
See application file for complete search history.

(56) References Cited

U.S. PATENT DOCUMENTS

| | | | |
|---|---|---|---|
| 7,068,376 B2 * | 6/2006 | De Groot ....................... | 356/497 |
| 2002/0135775 A1 * | 9/2002 | De Groot et al. ............. | 356/497 |
| 2005/0225769 A1 | 10/2005 | Bankhead et al. | |
| 2008/0111996 A1 | 5/2008 | Takeda et al. | |
| 2009/0109444 A1 | 4/2009 | Wan | |

FOREIGN PATENT DOCUMENTS

| | | |
|---|---|---|
| JP | 9318329 | 12/1997 |
| WO | 94/18523 | 8/1994 |
| WO | 2006/068217 | 6/2006 |

OTHER PUBLICATIONS

European Communication Under Rule 71(3) issued Oct. 23, 2012, 37 pages.
Hirai, et al., "White-Light Interferometry Using Pseudo Random-Modulation for High-Sensitivity and High-Selectivity Measurements", National Research Laboratory of Metrology, Optics Communications 162 (1999) 11-15, Apr. 1, 1999, three pages.

* cited by examiner

*Primary Examiner* — Tari Fur Chowdhury
*Assistant Examiner* — Jonathan Hansen
(74) *Attorney, Agent, or Firm* — Rankin, Hill & Clark LLP

(57) ABSTRACT

A shape measuring apparatus includes: an optical system configured to guide a light from a light source having a wideband spectrum to an object to be measured and a reference face; an imaging unit configured to image the interfering light intensity distribution image output from the optical system; an optical path length difference changing unit configured to change the optical path length difference; and an arithmetic processing unit configured to obtain the peak value of an interfering light intensity sequence indicating the change in the interfering light intensity due to the change in the optical path length difference at each measurement position of the interfering light intensity distribution images stored in the image storing unit, and configured to obtain the peak value as the position in the direction of the optical axis at each measurement position of the object to be measured.

3 Claims, 6 Drawing Sheets

SHAPE MEASURING APPARATUS

CROSS-REFERENCE TO RELATED APPLICATION(S)

This application is based upon and claims the benefit of priority from Japanese Patent Application No. 2010-177671, filed on Aug. 6, 2010, the entire contents of which are incorporated herein by reference.

BACKGROUND

1. Field of the Invention

The present invention relates to a shape measuring apparatus for measuring the position of a measuring face on the basis of the light applied from a light source having a wideband spectrum to the measuring face and the interference intensity of the light applied to a reference face.

2. Description of the Related Art

Conventionally, various shape measuring apparatuses have been known in which the three-dimensional shape of an object to be measured is measured in a non-contact state using an optical system. For example, a white light interferometer is known as a shape measuring apparatus capable of three-dimensionally measuring very small objects to be measured, such as micromachines and LSIs. In this white light interferometer, the white light applied from a white light source to an object to be measured and reflected by the object to be measured is made to interfere with the white light applied from the white light source to a reference face and reflected by the reference face, a reference face position having the largest interfering light intensity is detected while the reference face is moved in the direction of the optical axis, and the height of the object to be measured in the direction of the optical axis is measured on the basis of this reference face position (refer to International publication No. 2006-068217).

As this kind of white light interferometer, a shape measuring apparatus is known as an apparatus of using simplified arithmetic processing in which the weighted average of inspection positions is calculated while the absolute value of the difference value between the interference fringe intensity values obtained before and after an optical path length difference is changed by a predetermined amount is used as a weight, and the value indicated by the weighted average is obtained as a peak position at which the absolute value of the difference value becomes the largest (refer to Japanese Patent No. 3220955).

Data actually obtained by measurement using this kind of white light interferometer is susceptible to the influence of noise, and large swells occur in some cases on the baseline of a signal depending on the characteristics of the surface of a sample.

SUMMARY

In consideration of this problem, an object of the present invention is to provide a shape measuring apparatus capable of obtaining stable and accurate measurement results while suppressing the influence of noise.

According to an aspect of the invention, there is provided a shape measuring apparatus including: a light source having a wideband spectrum; an optical system configured to guide the light from the light source to an object to be measured and a reference face, configured to combine the light reflected from the object to be measured and the light reflected from the reference face, and configured to generate an interfering light intensity distribution image indicating interferring light intensity that corresponds to each measurement position inside the measuring face of the object to be measured and changes depending on the difference between a first optical path length from the light source to the object to be measured and a second optical path length from the light source to the reference face; an imaging unit configured to image the interfering light intensity distribution image output from the optical system; an optical path length difference changing unit configured to change the optical path length difference between the first optical path length and the second optical path length; an image storing unit configured to sequentially store interfering light intensity distribution images that are imaged using the imaging unit and changed depending on the change in the optical path length difference; and an arithmetic processing unit configured to obtain the peak value of an interfering light intensity sequence indicating the change in the interfering light intensity due to the change in the optical path length difference at each measurement position of the interfering light intensity distribution images stored in the image storing unit, and configured to obtain the peak value as the position in the direction of the optical axis at each measurement position of the object to be measured, the arithmetic processing unit including: a plurality of signal generating unit configured to generate a direct-current signal and a plurality of periodic signals depending on the center frequency of the interfering light intensity sequence; a weighting unit configured to weight the respective signals output from the pluralities of signal generating unit; a first signal adding unit configured to add the signals output from the weighting unit with respect to the periodic signals, and configured to output the obtained signal as a detection signal; a second signal adding unit configured to add the signal output from the weighting unit with respect to the direct-current signal to the detection signal; a signal subtracting unit configured to subtract the output of the second signal adding unit from the interfering light intensity sequence, and configured to output an error signal; an adaptive signal processing block having an adaptive algorithm section for adjusting the weights of the weighting unit on the basis of the error signal; and a peak detection block configured to detect the peak position of the detection signal.

The adaptive algorithm section may execute algorithm using an RLS (Recursive Least Square) method.

The peak detection block may include: a squaring unit configured to output the squared value of the detection signal; an integrating unit configured to integrate the output signal from the squaring unit, and configured to output the obtained signal; a smoothing and differentiating unit configured to smooth and differentiate the output signal from the integrating unit, and configured to output the obtained signal; and a peak position detecting unit configured to detect the peak value from the output signal of the smoothing and differentiating unit.

With the present invention, stable and accurate measurement results can be obtained while the influence of noise is suppressed.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Next, a shape measuring apparatus and a shape measuring method according to a first embodiment of the present invention will be described in detail.

Figure 1:
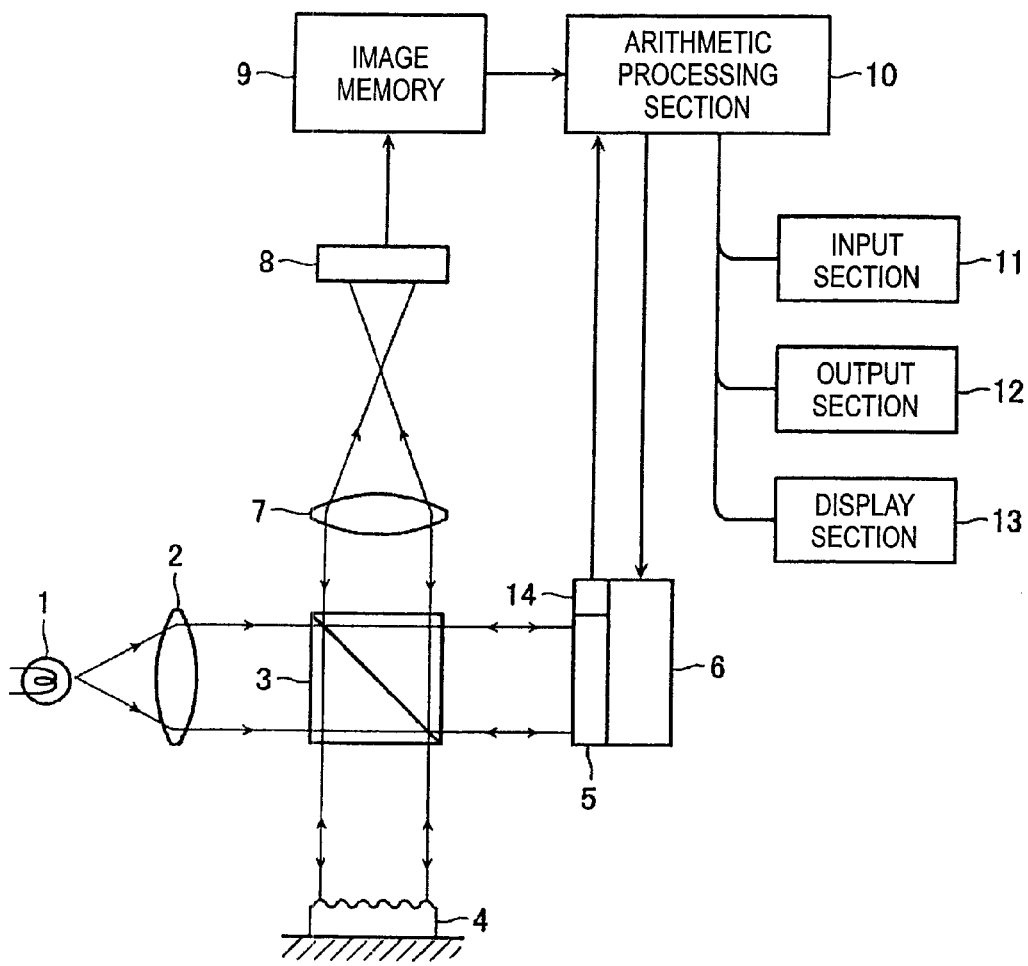
FIG. 1 is a block diagram showing a configuration of a shape measuring apparatus according to a first embodiment of the present invention.

FIG. 1 is a view showing a configuration of a white light interferometer serving as the shape measuring apparatus according to this embodiment. Although a Michelson interferometer is shown herein, another equivalent interferometer, such as a Mirau interferometer, can also be used. Furthermore, an interferometer being used in combination with another optical measuring apparatus, such as an image measuring apparatus, may be used.

A light source 1 is a white light source having a wideband spectrum, such as a halogen lamp, a Xenon lamp, a mercury lamp, a metal halide lamp or an LED. The white light emitted from the light source 1 is collimated by a collimator lens 2 and split by a beam splitter 3 into two directions. One of the split beams is applied to the measuring face of a workpiece 4 serving as an object to be measured, and the other split beam is applied to the reference face of a reference plate 5. The white light beams respectively reflected by the measuring face and the reference face are combined by the beam splitter 3. The interfering light obtained at that time is imaged by a CCD camera 8 via an imaging lens 7.

The reference plate 5 is moved and scanned in the direction of the optical axis using a drive unit 6, such as a piezo element. An interference image at each scanning position is sampled using the CCD camera 8 and stored in an image memory 9. An arithmetic processing section 10 determines the position of the measuring face of the workpiece 4 in the height direction thereof on the basis of the intensity of the interfering light at each measurement position on the measuring face of the workpiece 4 and the scanning position information of the reference plate 5 being input from an encoder 14. Furthermore, the arithmetic processing section 10 is equipped with an adaptive signal processing block 100 (FIG. 4) for eliminating noise and a peak detection block 110 (FIG. 5) for detecting the peak position of the intensity of the interfering light, these being described later and used to determine the position of the measuring face of the workpiece 4 in the height direction thereof. Data necessary for measurement is input to the arithmetic processing section 10 through an input section 11. A measurement result obtained at the arithmetic processing section 10 is output through an output section 12. Moreover, information necessary for input operation and the measurement result are displayed on a display section 13.

Next, a shape measuring method using this white light interferometer will be described below.

Figure 2:
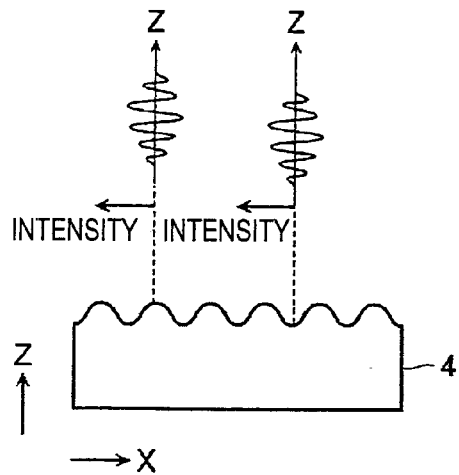
FIG. 2 is a view illustrating a shape measuring method in the apparatus.

The white light from the light source 1 is reflected by the measuring face of the workpiece 4 and the reference face of the reference plate 5 and combined by the beam splitter 3. The intensity of the interfering light at that time is determined by the optical path length difference between a first optical path length from the light source 1 to the workpiece 4 and a second optical path length from the light source 1 to the reference plate 5. When the first and second optical path lengths are equal to each other, the intensity of the interfering light becomes largest. The intensity of the interfering light is changed by moving and scanning the reference plate 5 in the direction of the optical axis using the piezo element 6. The range in which interference fringes are generated can be narrowed using white light having low coherence. Hence, as shown in FIG. 2, for example, the change in the intensity of the interfering light at each position on the measuring face, generated by the movement and scanning of the reference face, is generated at a phase corresponding to the height of the measuring face (the position in the Z direction). For this reason, the scanning position of the reference face at which the peak value of the change in the intensity of the interfering light at each position on the measuring face is observed can be obtained as the height of a portion corresponding to the measuring face.

Figure 3:
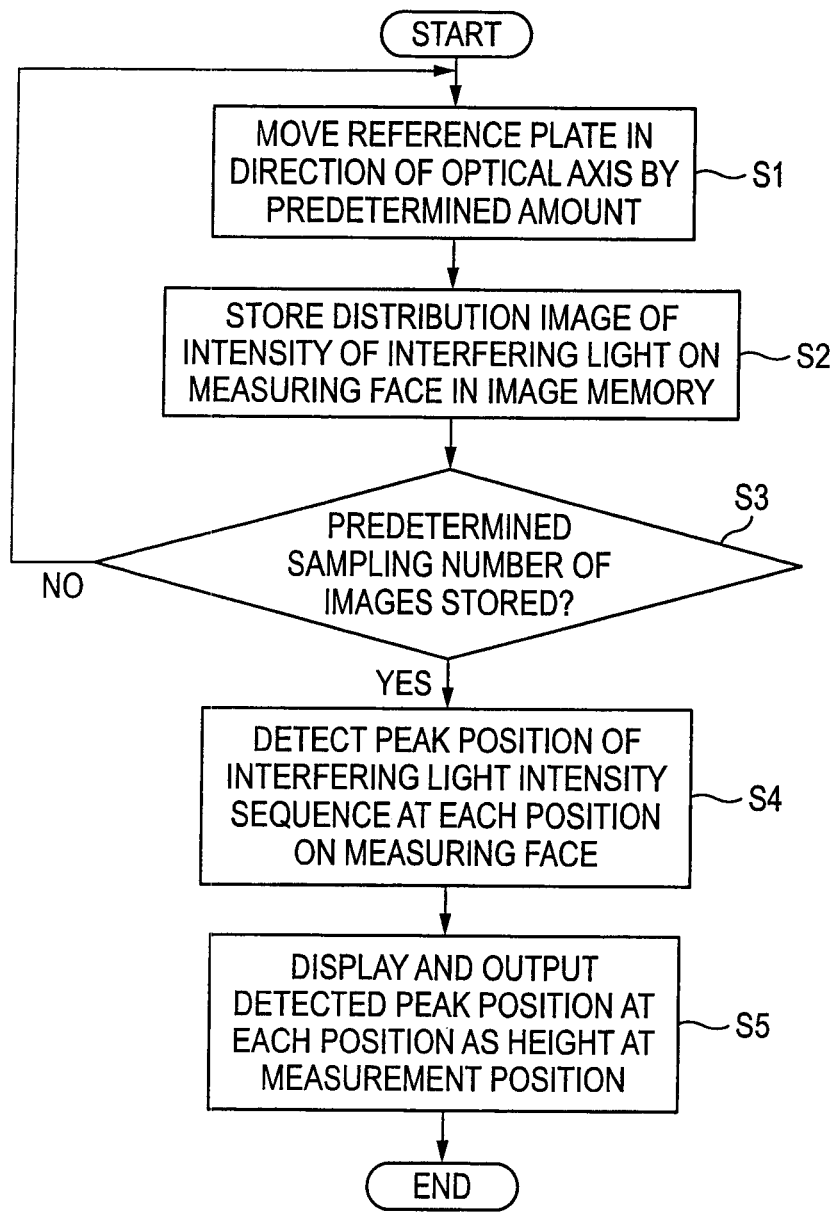
FIG. 3 is a flowchart illustrating the shape measuring method in the apparatus.

FIG. 3 is a flowchart showing the shape measuring method.

The reference plate 5 is moved in the direction of the optical axis by a predetermined amount (at S1), and the two-dimensional distribution image of the intensity of the interfering light on the measuring face is stored in the image memory 9 (at S2). These two steps are repeated by the number of times corresponding to a predetermined sampling number (at S3). After the predetermined number of distribution images are stored in the image memory 9, the peak position of interfering light intensity sequence indicating the change in the intensity of the interfering light due to the change in the optical path length difference at each measurement position on the measuring face is detected as shown in FIG. 2 (at S4). Then, the detected peak position at each measurement position is displayed and output as the height at the measurement position (at S5).

Figure 6A:
FIG. 6A is a view showing an example of the input signal of the adaptive signal processing section in the apparatus.

The interfering light intensity sequence indicating the change in the intensity of the interfering light includes noise due to the influence of the material of the workpiece 4, measurement environment, etc., whereby the S/N ratio thereof is decreased or the baseline thereof fluctuates as shown in FIG. 6A. Hence, in this embodiment, the adaptive signal processing block 100 included in the arithmetic processing section 10 eliminates this noise. As a result, the fluctuation of the baseline and the noise content are eliminated as shown in FIG. 6B.

Figure 4:
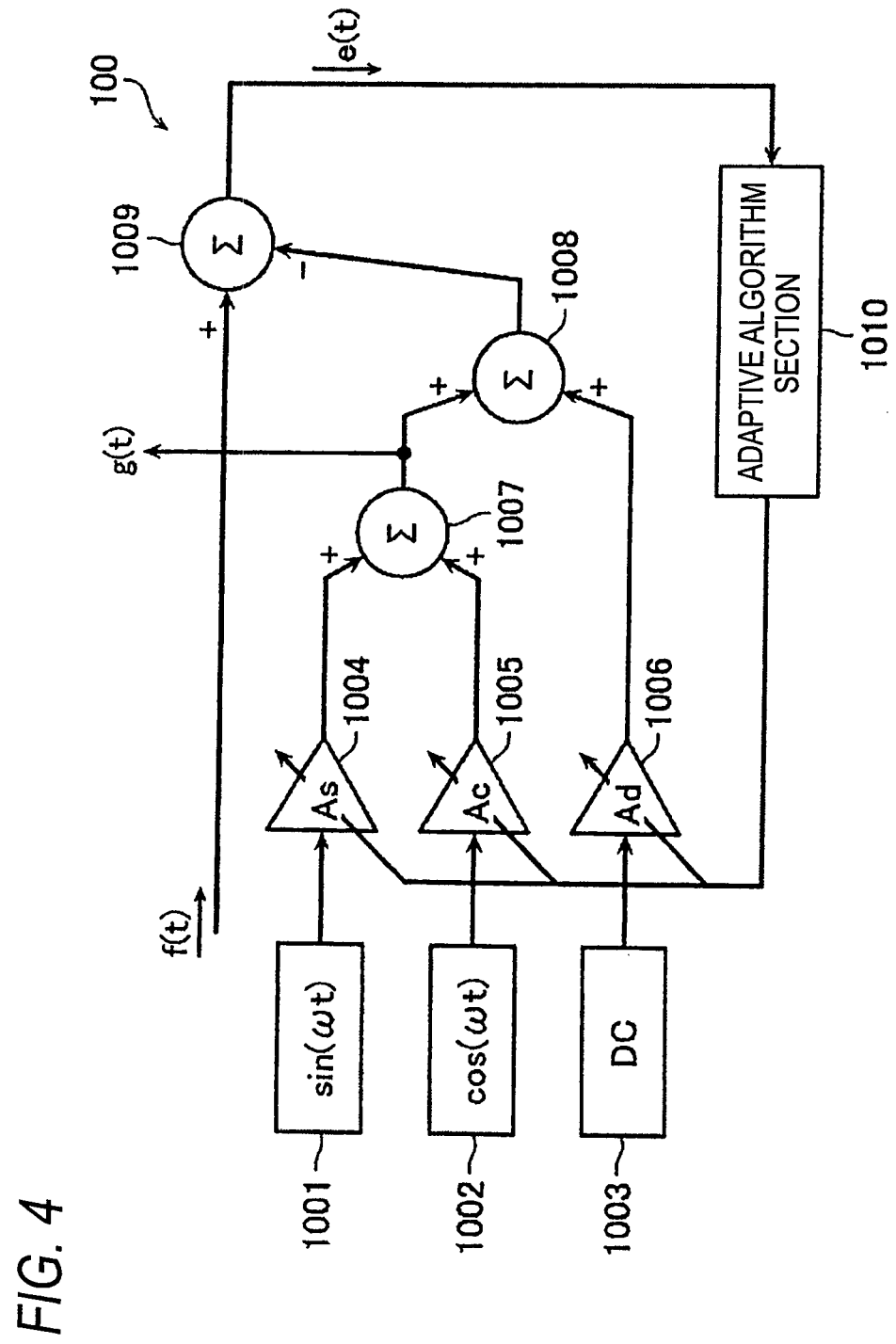
FIG. 4 is a block diagram showing a configuration of an adaptive signal processing section in the apparatus.

FIG. 4 is a block diagram showing a configuration of the adaptive signal processing block 100. The adaptive signal processing block 100 has signal generating circuits 1001, 1002 and 1003 for generating a sine signal $\sin(\omega t)$ and a cosine signal $\cos(\omega t)$, oscillating at the center frequency $\omega$ of the interfering light intensity sequence, and a direct-current signal DC, respectively. These signals are respectively weighted by weighting circuits 1004, 1005 and 1006. The outputs of the center frequency component weighting circuits 1004 and 1005 are added by an adder 1007 and then output as a detection signal $g(t)$. The output of this adder 1007 and the output of the direct-current component weighting circuit 1006 are added by an adder 1008. A subtracter 1009 subtracts the output of the adder 1008 from the observation signal $f(t)$ of the interfering light intensity sequence and then outputs an error signal e(t) as the result of the subtraction. This error signal e(t) is input to an adaptive algorithm section 1010. This adaptive algorithm section 1010 adaptively changes the weighting coefficients As, Ac and Ad of the weighting circuits 1004, 1005 and 1006 so that the error signal e(t) becomes smallest. Although the adaptive algorithm section 1010 can use an adaptive algorithm, such as an LMS (Least Mean Square) method or an RLS (Recursive Least Square) method, it is desired that the latter method, the RLS method, should be used because of its high convergence speed.

Figure 6B:
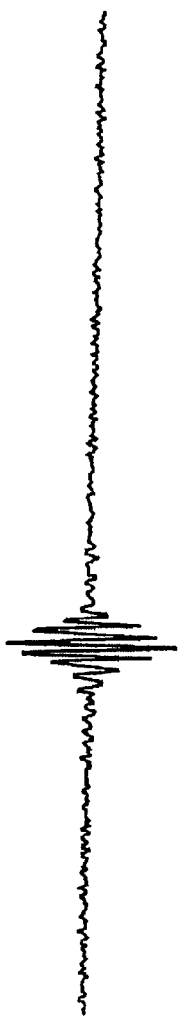
FIG. 6B is a view showing an example of the detection signal thereof.

With the adaptive signal processing block 100 configured as detailed above, the detection signal g(t) from which noise is eliminated as shown in FIG. 6B can be obtained from the observation signal f(t) of the interfering light intensity sequence including the noise shown in FIG. 6A. In other words, the observation signal f(t) in the adaptive signal processing block 100 can be represented by Expression 1, and the detection signal g(t) including only the component of the center frequency ω and represented by Expression 2 is obtained by obtaining the weighting coefficients As, Ac and Ad so that the error signal e(t) becomes smallest.

$$f(t) = [\begin{matrix} As & Ac & Ad \end{matrix}] \begin{bmatrix} \sin(\omega t) \\ \cos(\omega t) \\ 1 \end{bmatrix} + e(t) \quad \text{Expression 1}$$

$$g(t) = As \cdot \sin(\omega t) + Ac \cdot \cos(\omega t) \quad \text{Expression 2}$$

In a method in which such adaptive signal processing as described in this embodiment is used, it is not necessary that all data are available for the interfering light intensity sequence, and time-series sequential processing can be carried out each time the sample of the interfering light intensity sequence of each pixel is obtained. For example, it is possible to carry out real-time processing in which sequential arithmetic processing and screen display are carried out simultaneously with the acquisition of each sample of the interfering light intensity sequence, and a displayed image is gradually renewed as the measurement proceeds.

Figure 5:
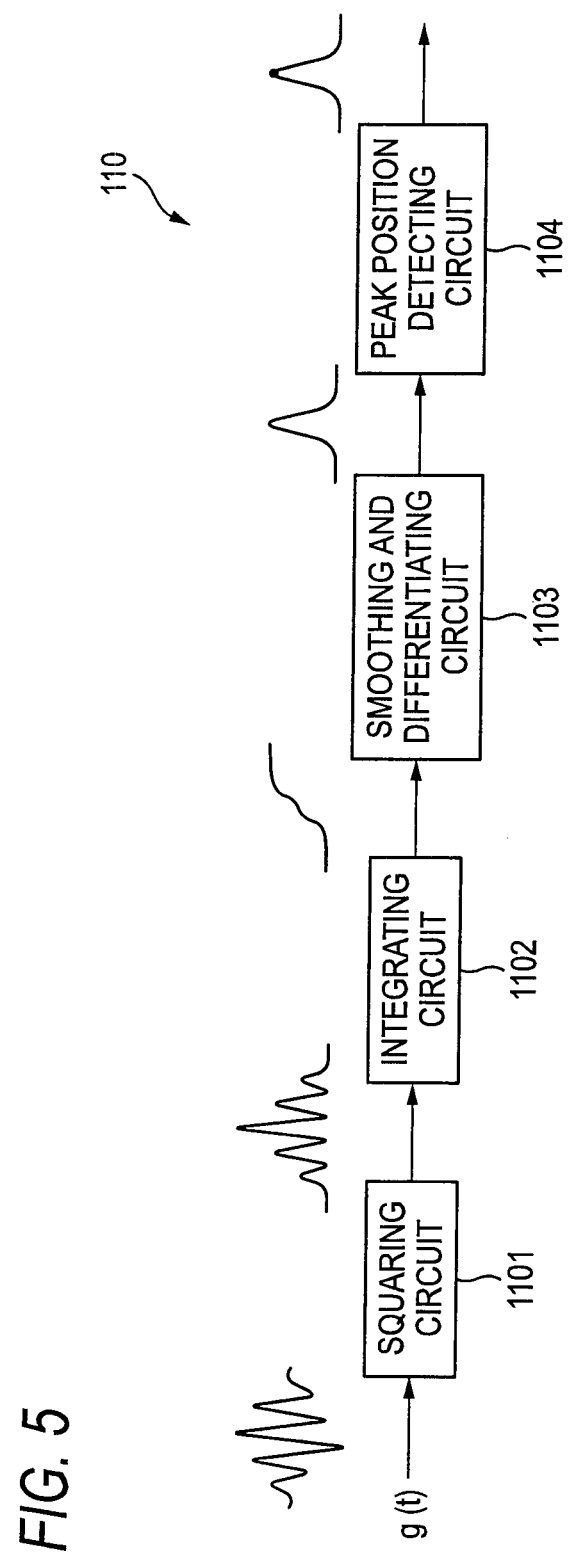
FIG. 5 is a block diagram showing a configuration of a peak detection processing section in the apparatus.

FIG. 5 is a block diagram showing a configuration of the peak detection block 110 in the apparatus. The peak detection block 110 has a squaring circuit 1101, an integrating circuit 1102, a smoothing and differentiating circuit 1103, and a peak position detecting circuit 1104, these being connected in this order.

Next, the operation of the peak detection block 110 configured as detailed above will be described below. When the detection signal g(t) is input to the peak detection block 110, the detection signal g(t) is first squared by the squaring circuit 1101 and is integrated by the integrating circuit 1102. Then, the obtained signal is smoothed and differentiated by the smoothing and differentiating circuit 1103. Finally, the peak position is detected by the peak position detecting circuit 1104. In this configuration, after the detection signal g(t) is squared and integrated, the obtained signal is not simply differentiated but is smoothed and differentiated, whereby it is possible to obtain the peak position stably.

Next, the effect of the shape measurement according to this embodiment will be described below. FIGS. 6A and 6B and FIGS. 7A and 7B show the input signal f(t) and the detection signal g(t) of the adaptive signal processing block 100.

FIG. 6A shows an example in which the baseline of the input signal f(t) has fluctuated significantly during signal measurement. On the other hand, FIG. 6B shows the detection signal g(t) obtained when the input signal f(t) shown in FIG. 6A was input to the adaptive signal processing block 100. As shown in FIG. 6B, the fluctuation of the baseline is eliminated almost completely, and the S/N ratio is improved remarkably.

Figure 7A:
FIG. 7A is a view showing another example of the input signal of the adaptive signal processing section in the apparatus.
Figure 7B:
FIG. 7B is a view showing another example of the detection signal thereof.

FIG. 7A shows an example in which the detection signal component of the input signal f(t) is very weak in comparison with the fluctuation of the baseline. As shown in the figure, the baseline of the input signal f(t) fluctuates significantly and the signal component is swallowed up. On the other hand, FIG. 7B shows the detection signal g(t) obtained when the input signal f(t) shown in FIG. 7A was input to the adaptive signal processing block 100. As in the case shown in FIG. 6B, the fluctuation of the baseline is eliminated almost completely, and the S/N ratio is improved remarkably.

According to these results, in the shape measuring apparatus according to this embodiment, even in the case that the baseline of the input signal f(t) fluctuates significantly or the signal component of the input signal f(t) is very weak, the detection signal g(t) in which the fluctuation of the baseline is suppressed can be output, and a stable and accurate measurement result can be obtained.

Figure 8A:
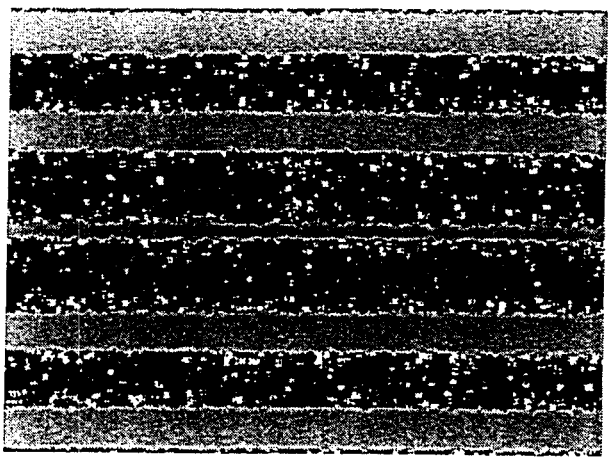
FIG. 8A is a view showing the observation data of an object to be measured in the apparatus.
Figure 8B:
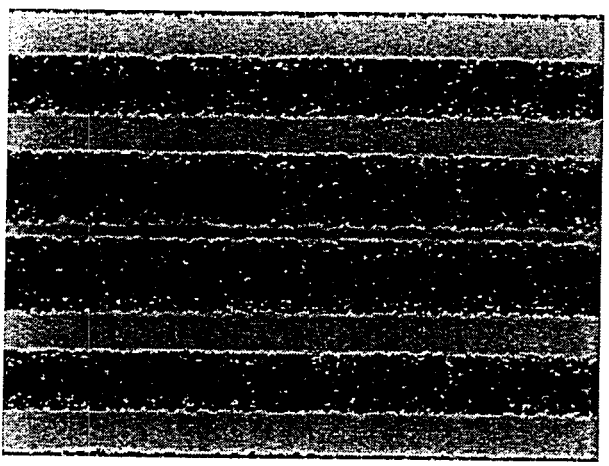
FIG. 8B is a view showing the observation data of the object to be measured in the conventional shape measuring apparatus, these being provided for comparison.

FIGS. 8A and 8B show results obtained when a peak is detected at each pixel position and converted into shape data. FIG. 8A shows image data obtained according to the conventional shape measuring apparatus and FIG. 8B shows image data obtained according to this embodiment. The number of pixels is 307200 for both FIGS. 8A and 8B.

The perforated portions in the figures indicate missing data. As understood from the figures, the number of the missing data in this embodiment has been decreased significantly in comparison with that in the conventional shape measuring apparatus. Actually, although the number of the missing data in the conventional shape measuring apparatus is 6385 of the total number of pixels, 307200, the number of the missing data in the shape measuring apparatus according to this embodiment is 2 of the total number of pixels, 307200. As a result, the stability of the shape measurement according to this embodiment has been improved significantly in comparison with that of the conventional shape measurement.

In the method according to the first embodiment, since the signal processing of each pixel is carried out completely independently, the respective pixels can be processed individually. Hence, for example, in the case that the arithmetic processing in respective pixels is allocated to a plurality of CPUs, the speed of the arithmetic processing is improved abruptly. Ideally, it is desired that as many CPUs as the number of the pixels should be used and that a specific pixel should be allocated to each CPU. In this case, the processing for respective pixels can be parallelized completely. Furthermore, real-time parallel processing can be attained easily by combining the above-mentioned real-time processing.

Although the detection signal is represented by Expression 2 in the first embodiment, the detection signal is represented by Expression 3 in a third embodiment. In this case, A designates a signal amplitude and φ designates a signal phase, these being represented by Expression 4 and Expression 5, respectively.

$$g(t) = A \cdot \sin(\omega t + \phi) \quad \text{Expression 3}$$

$$A = \sqrt{As^2 + Ac^2} \quad \text{Expression 4}$$

$$\phi = \tan^{-1}\left(\frac{As}{Ac}\right) \qquad \text{Expression 5}$$

Mathematically, Expression 2 and Expression 3 represent the same thing. However, in the case that arithmetic processing is carried out using Expression 3, A and φ are adjusted instead of As and Ac in the adaptive signal processing. In this kind of method, for example, it is possible to set different weights to A and φ. Furthermore, a concept referred to as a forgetting constant is present in the RLS method. This represents that data up to which time point in the past should be utilized for estimation. Even for this forgetting constant, adequate values can be set to, the respective A and φ.

Although an example in which the number of the components of the center frequency ω is one is provided in the first embodiment, it may be possible that a plurality of components are used for the center frequency ω so as to correspond to the wavelength components of the light source 1 to be used. In other words, actually, in the interfering light intensity sequence, there is a distribution in frequency, instead of the single frequency ω as in Expression 2 and Expression 3. Hence, more accurate estimation can be carried out by using an expression, such as Expression 6 described below. In consideration of real time performance, realistically, it is desired that calculation for approximately three components should be carried out using Expression 6. Hence, the maximum amplitude position can be estimated, and at the same time, the phase of each frequency component can be measured. Although the interfering light intensity sequence includes a plurality of frequencies as detailed above, the phases of the respective frequency components become coincident at the maximum amplitude position. Consequently, with the estimation method that uses Expression 6, it is possible to carry out estimation having higher accuracy by using not only amplitude but also phase information.

$$g(t) = \sum_k A_k \cdot \sin(\omega_k t + \phi_k) \qquad \text{Expression 6}$$

What is claimed is:

1. A shape measuring apparatus comprising:
   a light source having a wideband spectrum;
   an optical system configured to guide the light from the light source to an object to be measured and a reference face, configured to combine the light reflected from the object to be measured and the light reflected from the reference face, and configured to generate an interfering light intensity distribution image indicating interfering light intensity that corresponds to each measurement position inside the measuring face of the object to be measured and changes depending on the difference between a first optical path length from the light source to the object to be measured and a second optical path length from the light source to the reference face;
   an imaging unit configured to image the interfering light intensity distribution image output from the optical system;
   an optical path length difference changing unit configured to change the optical path length difference between the first optical path length and the second optical path length;
   an image storing unit configured to sequentially store interfering light intensity distribution images that are imaged using the imaging unit and changed depending on the change in the optical path length difference; and
   an arithmetic processing unit configured to obtain the peak value of an interfering light intensity sequence indicating the change in the interfering light intensity due to the change in the optical path length difference at each measurement position of the interfering light intensity distribution images stored in the image storing unit, and configured to obtain the peak value as the position in the direction of the optical axis at each measurement position of the object to be measured, the arithmetic processing unit including:
      a plurality of signal generating unit configured to generate a direct-current signal and a plurality of periodic signals depending on the center frequency of the interfering light intensity sequence;
      a weighting unit configured to weight the respective signals output from the pluralities of signal generating unit;
      a first signal adding unit configured to add the signals output from the weighting unit with respect to the periodic signals, and configured to output the obtained signal as a detection signal;
      a second signal adding unit configured to add the signal output from the weighting unit with respect to the direct-current signal to the detection signal;
      a signal subtracting unit configured to subtract the output of the second signal adding unit from the interfering light intensity sequence, and configured to output an error signal;
      an adaptive signal processing block having an adaptive algorithm section for adjusting the weights of the weighting unit on the basis of the error signal; and
      a peak detection block configured to detect the peak position of the detection signal.

2. The shape measuring apparatus according to claim 1, wherein
   the adaptive algorithm section executes algorithm using an RLS (Recursive Least Square) method.

3. The shape measuring apparatus according to claim 1, wherein
   the peak detection block includes:
      a squaring unit configured to output the squared value of the detection signal;
      an integrating unit configured to integrate the output signal from the squaring unit, and configured to output the obtained signal;
      a smoothing and differentiating unit configured to smooth and differentiate the output signal from the integrating unit, and configured to output the obtained signal; and
      a peak position detecting unit configured to detect the peak value from the output signal of the smoothing and differentiating unit.

* * * * *